Patented Dec. 8, 1931

1,835,724

UNITED STATES PATENT OFFICE

CARSON W. SIMMS, OF TERRE HAUTE, INDIANA, ASSIGNOR TO COMMERCIAL SOLVENTS CORPORATION, OF TERRE HAUTE, INDIANA, A CORPORATION OF MARYLAND

FINISH REMOVER

No Drawing. Application filed December 19, 1927. Serial No. 241,262.

My invention relates to improved compositions for removing nitrocellulose lacquer films from surfaces to which they have been applied. My invention pertains specifically to suitable liquid compositions capable of decreasing the adherence of the nitrocellulose film to the undersurface in such a manner that it can be readily removed therefrom without any damage to the latter. In some cases the film is partly dissolved by the remover and in other cases there is no apparent dissolving action, yet the film is loosened.

The analogous art of removing paint and varnish is a highly developed one. For the purpose of removing paint and varnish, solvent mixtures containing alcohols, ketones, esters, and the like in combination with liquid hydrocarbons, such as those of the coal tar series—e. g., benzol, toluol, etc. or those of the petroleum series such as petroleum naphtha have been used. Various theories have been evolved to explain the solvent action of these mixtures on the films but these need not be discussed.

To reduce the cost and otherwise increase the efficiency of using such a remover, it has been necessary to retard the evaporation rate of the volatile solvent materials comprising it. A great variety of retardent substances has been proposed in the literature but probably the most successful and useful of these are paraffin, vegetable wax and beeswax. Paint and varnish removers containing wax are protected from rapid evaporation during use by the formation of a scum or film of wax on top of the liquid. It so happens that the most useful paint and varnish removers—i. e., those materials containing acetone, ethyl alcohol, benzol, etc. are also capable of dissolving or softening nitrocellulose lacquer films and they have been used for this purpose to a large extent. Such materials seem to dissolve both the nitrocelluose per se and the other solids such as the gums, which substances form the principal constitutents of lacquer.

There are, however, two great objections to the use of ordinary paint and varnish removers for use on lacquer and the object of the present invention is to devise a new solvent composition containing a retardent which will more suitably remove lacquer. One of the principal objections to the use of ordinary paint and varnish removers for this purpose rests in the fact that these materials usually contain wax, a very small trace of which is left on the cleaned surface from which the paint or varnish or lacquer has been removed. A mere trace of wax on an otherwise clean surface will cause lacquer applied thereon to dry very slowly and hence great difficulty has been experienced in attempting to relacquer objects from which old films have been removed by the use of wax-containing removers. The other principal objection noted is the fact that ordinary paint and varnish removers do not merely "lift" lacquer films as they do paint and varnish films so that the said film can be stripped off easily, but rather they dissolve these films and when it is attempted to remove the mixture from the surface, a smeared job results.

I have now discovered a new type of solvent mixture that is useful for removing lacquer and which constitutes a great improvement over the prior art. This new type of composition contains a solvent for nitrocellulose and also contains "diluents" or non-solvents for nitrocellulose, these two ingredients being combined in such proportions that the solvent power of the nitrocellulose solvent material present is vitiated. In other words the balance of the mixture is destroyed and as rapidly as any nitrocellulose is dissolved by the nitrocellulose solvent present in the mixture, the excess of diluent (non-solvent) used acts to throw the dissolved nitrocellulose out of the solution again. By the adoption of this principle of formulation, I have found that mixtures of solvent and non-solvent for nitrocellulose can be readily prepared that will not actually dissolve the lacquer film but will merely serve to soften or loosen it so that it may be removed as a film in a manner analogous to that employed in the paint and varnish art.

The subject of "solvent balance" which implies the limit of tolerance of a solution of nitrocellulose for a non-solvent material is well understood by those skilled in the lacquer art and is discussed in detail by Brown and Bogin in Journal of Industrial and Engineering Chemistry, vol. 19, page 968 (1927). A solution of nitrocellulose will tolerate the addition of some quantity of a non-solvent, but after a critical point is reached the further additions will cause a precipitation or gelling of the nitrocellulose. The amount of non-solvent that is possible to add to a nitrocellulose solution before precipitation or gelling takes place, depends largely upon the limit of tolerance of the nitrocellulose solvent for the particular diluent. This limit of tolerance of a nitrocellulose solution for any particular non-solvent can be readily determined experimentally. It is by proportioning the nitrocellulose solvent and nitrocellulose non-solvent in such a manner that any nitrocellulose tending to dissolve in the solvent will be thrown out of solution by the non-solvent, that I achieve the favorable results described in this specification.

The evaporation rates of individual solvents and non-solvents vary widely. It is obvious then that if one ingredient of a solvent—non-solvent mixture evaporates at a considerably faster rate than the other, the "solvent balance" of the mixture will be destroyed unless care has been taken to provide a fairly large excess of the faster evaporating constituent. When the tolerance ratio has been exceeded either by the addition of a non-solvent or by the rapid evaporation of solvent, nitrocellulose is precipitated out of solution either in the form of a gel or a form resembling cotton fibres.

When a composition containing a nitrocellulose non-solvent and a nitrocellulose solvent evaporating faster than the non-solvent, in such proportions that the solvent is just slightly in excess of its tolerance ratio to the non-solvent, is applied to a surface coated with nitrocellulose the following phenomenon takes place. The solvent present first dissolves the nitrocellulose. As the slight excess of faster evaporating solvent leaves the mixture the "solvent balance" is destroyed, leaving an excess of non-solvent which precipitates the nitrocellulose. The nitrocellulose in this precipitated form may then be easily removed from the surface being cleaned.

I have found that still more advantageous results may be obtained by using a mixture in which the tolerance ratio has been slightly exceeded, i. e. a non-solvent mixture for nitrocellulose or one which immediately precipitates it. (By "tolerance ratio" is meant the maximum volume of the diluent which can be added to the nitrocellulose solvent without destroying its power to act as a solvent, the concentration of the nitrocellulose being approximately that used in practical lacquers.) A mixture of this composition, instead of dissolving the nitrocellulose and reprecipitating it in a softened or gel form, merely softens the nitrocellulose film and leaves it in non-sticky or rather plastic form which is very easily and thoroughly removed from the surface being cleaned.

As the non-solvent or diluent I may use either a liquid coal tar hydrocarbon such as toluol or xylol, or a liquid petroleum hydrocarbon such as petroleum naphtha or a high boiling grade of gasolene. The point of chief importance is that whatever hydrocarbon is used should have a slower rate of evaporation than the nitrocellulose solvent. I have found, however, that the petroleum hydrocarbons have certain advantages over the coal tar hydrocarbons. These advantages lie in the fact that when petroleum hydrocarbons are used the nitrocellulose is precipitated in a flocculent form while with coal tar hydrocarbons it is precipitated as a coherent gel. In the former case the film is found to be much more easily removed from the surface being cleaned.

As the solvent in my improved removers I may use any of a number of materials which are generally used as solvents for nitrocellulose. It is desirable, however, that the material chosen should attack at a fairly rapid rate the finish being renewed and should evaporate somewhat faster than the diluent employed. Examples of solvents suitable for use are acetone, methyl ethyl ketone, methyl acetate, ethyl acetate, propyl acetate, diacetone alcohol and other esters, ketones, etc. commonly used as nitrocellulose solvents.

In order to reduce the rate of evaporation of the liquids employed in my improved removers so that they will remain on the lacquer film long enough to loosen it, I find it advantageous to employ certain evaporation retardents such as gels formed by alcohols with materials such as sodium nitrophthalate, calcium-o-nitrobenzoate, sodium alum or calcium acetate. My improved remover operates quite satisfactorily, however, without the addition of retarders. While all of the materials just mentioned are entirely suitable for the purpose for which they are used I have found that the last named is particularly suitable due to its cheapness as well as its efficient operation. Calcium acetate-alcohol gels are obtained by vigorously shaking together an aqueous solution of calcium acetate and ethyl alcohol or other alcohols.

Since it is often desired to employ a remover on a vertical or inclined surface it is very advantageous to include in its composition some substance to give it "body" and thus prevent it from flowing off the surface being treated before sufficient time has elapsed to allow the solvent to act upon the film. For this purpose I have found it advantageous to include in my improved remover a suitable amount of nitrocellulose.

Since the solvent mixture employed is slightly over the tolerance limit for nitrocellulose, the latter will be precipitated before the application of the remover. In addition to acting as a thickening agent, the presence of this precipitated nitrocellulose seems to actually increase the activity of the remover.

The particular grade of nitrocellulose used in my new composition is not a matter of great importance, provided to other constituents present are suitably varied. For example, I may satisfactorily employ different grades of nitrocellulose ranging from half second viscosity to the more viscous grades known as dope cotton. Half second nitrocellulose is the grade of nitrocellulose having a viscosity such that one-half second is required for a $\frac{5}{16}''$ steel ball to fall thru ten inches of a solution in a one inch diameter vertical column at a temperature at 25° C., a definite amount of nitrocellulose and a standard solvent mixture being employed. Measured on a similar scale, dope cotton ranges in viscosity from approximately 20 seconds up to 200 seconds.

The examples given below are cited for the purpose of showing a number of the possible variations in composition of my new removers and it should be understood that my invention is not limited by these specific examples.

*Example I*

| | Parts |
|---|---|
| Dope cotton dissolved in acetone (10 grams per 100 cc.) | 10 |
| 95% ethyl alcohol | 20 |
| Petroleum naphtha | 20 |
| 20% aqueous solution of calcium acetate | 2 |

The consistency of the remover may be regulated as desired by the number of parts of aqueous solution of calcium acetate used. A remover of pasty consistency may be obtained by increasing the amount to about 5 parts.

In case it is preferred to omit the nitrocellulose, it is desirable that the amount of calcium acetate solution employed be increased somewhat in order that the remover may still have the necessary consistency. In such a case, 4 parts of a 20% aqueous solution of calcium acetate should be used in the composition shown under Example I. The 10 parts of dope cotton dissolved in acetone should be replaced by 9 parts of acetone.

As pointed out above, a satisfactory remover may also be obtained by having the initial composition such that the solvent is just slightly in excess of its tolerance ratio to the non-solvent. The faster evaporating solvent, however, causes the solvent balance of the mixture to be destroyed in a very short time. The nitrocellulose is then precipitated and the operation proceeds just as with the composition described under the example given above. A composition of this type is shown under Example II.

*Example II*

| | Parts |
|---|---|
| Dope cotton dissolved in acetone (8 grams in 100 cc.) | 10 |
| 95% ethyl alcohol | 15 |
| Petroleum naphtha | 15 |
| 20% aqueous solution of calcium acetate | 2 |

The removal of the nitrocellulose from the remover described under Example II would necessitate the addition of additional calcium acetate solution to give a remover of somewhat the same consistency. The remover would then have the composition shown under Example III.

*Example III*

| | Parts |
|---|---|
| Acetone | 9 |
| 95% ethyl alcohol | 14 |
| Petroleum naphtha | 14 |
| 20% aqueous solution of calcium acetate | 4 |

The calcium acetate solution serves only as an evaporation retarder in my improved removers and I may obtain an efficient composition without including it. Such a remover is shown in Example IV.

*Example IV*

| | Parts |
|---|---|
| Dope cotton dissolved in acetone (10 grams per 100 cc.) | 12 |
| 95% ethyl alcohol | 20 |
| Petroleum naphtha | 20 |

It is also possible to omit the ethyl alcohol if desired for any reason. In such case, the petroleum naphtha should be reduced to 10 parts in order to maintain the proper solvent balance.

In place of petroleum naphtha, a coal tar hydrocarbon such as toluol may be used, as shown in Example V.

*Example V*

| | Parts |
|---|---|
| Dope cotton dissolved in acetone (16 grams per 100 cc.) | 6 |
| 95% ethyl alcohol | 20 |
| Toluol | 24 |
| 20% aqueous solution of calcium acetate | 2 |

In place of ethyl alcohol, another alcohol such as methanol or butanol may be used, as shown in Example VI.

*Example VI*

| | Parts |
|---|---|
| Dope cotton dissolved in acetone (16 grams per 100 cc.) | 6 |
| Methanol | 20 |
| Toluol | 24 |
| 20% aqueous solution of calcium acetate | 2 |

Butanol may also replace ethyl alcohol in Example I, and in the other examples.

In place of acetone, ethyl acetate or other volatile solvents for nitrocellulose may be used. Acetone is preferred, however, since it exerts a more rapid solvent action as a remover. In Example VII, a remover containing ethyl acetate is shown.

Example VII

| | Parts |
|---|---|
| Dope cotton dissolved in ethyl acetate (12.5 grams per 100 cc.) | 8 |
| 95% ethyl alcohol | 20 |
| Petroleum naphtha | 22 |
| 20% aqueous solution of calcium acetate | '2 |

In place of "dope cotton" which has a viscosity of about 40 seconds as measured according to the ordinary methods in the lacquer art, one may use other varieties of nitrocellulose that are more or less viscous than dope cotton. For example, the so-called "half second" viscosity cotton (nitrocellulose) that is commonly employed in the manufacture of lacquers may be used in producing lacquer removers. In case this material is employed for the purpose, it is necessary to use solutions (in acetone or other solvent) containing more solid material than in the case of "dope cotton". In Example VIII a remover containing "half second cotton" is shown.

Example VIII

| | Parts |
|---|---|
| Half second viscosity nitrocellulose dissolved in acetone (35 grams per 100 cc.) | 10 |
| 95% ethyl alcohol | 20 |
| Petroleum naphtha | 20 |
| 20% aqueous solution of calcium acetate | 2 |

Example IX

In place of the aqueous solution of calcium acetate used in Examples I to VIII as an alcohol-gel agent, other materials forming gels with alcohol may be employed. There is a variety of salts whose aqueous solutions form gels with alcohol and all of these are suitable for the purpose. Three other commonly known and useful materials for the purpose are sodium alum, calcium ortho nitrobenzoate, and sodium nitrophthalate. In the case of sparingly soluble materials such as sodium nitrophthalate and sodium alum, saturated aqueous solutions are used. In the case of calcium ortho nitrobenzoate, a 20% solution will suffice. Whatever gelling agent used should be employed in approximately the same proportions as the calcium acetate shown in the examples above.

I have found that the method of preparation has a great bearing on the consistency of the final product. In preparing the composition shown under Example I above, I have found that the best results are obtained by following the procedure outlined below:

1. Mix the ethyl alcohol and one half of the petroleum naphtha.
2. Next add the nitrocellulose solution and agitate the resulting mixture.
3. Add the remainder of the petroleum naphtha and again agitate.
4. Finally, the calcium acetate solution is added and dispersed thru the nitrocellulose solution by vigorous agitation.

While my improved removers are designed especially for nitrocellulose lacquers, for which former types of removers have not been entirely satisfactory, they serve equally efficiently for the removal of paints and varnishes.

Now having described my invention, I claim the following as new and novel.

1. A paint, varnish and nitrocellulose lacquer remover comprising 10 parts of dope cotton dissolved in acetone (10 grams per 100 cc.), 20 parts of ethyl alcohol, 20 parts of petroleum naphtha, and 2–5 parts of a 20% aqueous solution of calcium acetate.

2. A paint, varnish and nitrocellulose lacquer remover comprising 10 parts of dope cotton dissolved in acetone (8 grams in 100 cc.) 15 parts of ethyl alcohol 15 parts of petroleum naphtha, and 2 parts of a 20% aqueous solution of calcium acetate.

3. A paint, varnish and lacquer remover comprising a nitrocellulose solvent and a nitrocellulose non-solvent selected from the group consisting of liquid coal tar hydrocarbons and liquid petroleum hydrocarbons and which has a slower rate of evaporation than that of the particular nitrocellulose solvent chosen the said solvent and non-solvent being present in such proportions that shortly after evaporation begins the tolerance ratio of the non-solvent to the solvent is always just exceeded.

4. A paint, varnish and lacquer remover comprising nitrocellulose, a nitrocellulose solvent and a nitrocellulose non-solvent selected from the group consisting of liquid coal tar hydrocarbons and liquid petroleum hydrocarbons and which has a slower rate of evaporation than that of the particular nitrocellulose solvent chosen, the said solvent and non-solvent being present in such proportions that shortly after evaporation begins the tolerance ratio of the non-solvent to the solvent is always just exceeded.

5. A paint, varnish and lacquer remover comprising nitrocellulose, an evaporation retarder, a nitrocellulose solvent and a nitrocellulose non-solvent selected from the group consisting of liquid coal tar hydrocarbons and liquid petroleum hydrocarbons and which has a slower rate of evaporation than that of the particular nitrocellulose solvent chosen, the said solvent and non-solvent being present in such proportions that shortly after evaporation begins the tolerance ratio of the non-solvent to the solvent is always just exceeded.

6. A paint, varnish and lacquer remover comprising an evaporation retarder, a nitrocellulose solvent and a nitrocellulose non-solvent selected from the group consisting of liquid coal tar hydrocarbons and liquid petroleum hydrocarbons and which has a slower rate of evaporation than that of the particular nitrocellulose solvent chosen, the said solvent and non-solvent being present in such proportions that shortly after evaporation begins the tolerance ratio of the non-solvent to the solvent is always just exceeded.

7. A paint, varnish and lacquer remover comprising a ketone and a liquid hydrocarbon selected from the group consisting of liquid coal tar hydrocarbons and liquid petroleum hydrocarbons and which has a slower rate of evaporation than that of the ketone, the said ketone and said liquid hydrocarbon being present in such proportions that shortly after evaporation begins the tolerance ratio of the liquid hydrocarbons to the ketone is always just exceeded.

8. A paint, varnish and lacquer remover comprising an evaporation retarder, a ketone and a liquid hydrocarbon selected from the group consisting of liquid coal tar hydrocarbons and liquid petroleum hydrocarbons and which has a lower rate of evaporation than that of the ketone, the said liquid hydrocarbon and ketone being present in such proportions that shortly after evaporation begins the tolerance ratio of the liquid hydrocarbon to the ketone is always just exceeded.

9. A paint, varnish and lacquer remover comprising nitrocellulose, an evaporation retarder, a ketone and a liquid hydrocarbon selected from the group consisting of liquid coal tar hydrocarbons and liquid petroleum hydrocarbons and which has a slower rate of evaporation than that of the ketone, the said ketone and liquid hydrocarbon being present in such proportions that shortly after evaporations begins the tolerance ratio of the liquid hydrocarbon to the ketone is always just exceeded.

In testimony whereof I affix my signature.

CARSON W. SIMMS.